(12) United States Patent
Uscumlic et al.

(10) Patent No.: US 12,155,566 B2
(45) Date of Patent: Nov. 26, 2024

(54) NETWORK DEVICE INCLUDING TRAINED NEURAL NETWORK

(71) Applicant: Nokia Solutions and Networks Oy, Espoo (FI)

(72) Inventors: Bogdan Uscumlic, Les Ulis (FR); Yu-Chia Tseng, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/572,884

(22) Filed: Jan. 11, 2022

(65) Prior Publication Data

US 2023/0224244 A1 Jul. 13, 2023

(51) Int. Cl.
*H04L 45/00* (2022.01)
*G06F 18/214* (2023.01)
*G06N 3/047* (2023.01)
*H04L 45/42* (2022.01)

(52) U.S. Cl.
CPC ......... *H04L 45/566* (2013.01); *G06F 18/214* (2023.01); *G06N 3/047* (2023.01); *H04L 45/42* (2013.01)

(58) Field of Classification Search
CPC .... G06K 9/6256; G06N 3/0472; G06N 3/047; G06N 20/00; H04L 45/566; H04L 45/42; H04L 45/08; H04L 45/12; H04L 45/14; H04L 45/16; H04L 45/20; H04L 45/22; H04L 45/24; H04L 45/302; H04L 45/34; H04L 45/36; H04L 45/38; H04L 45/44; H04L 45/70; G06F 18/214
USPC ....................................................... 709/238
See application file for complete search history.

(56) References Cited

U.S. PATENT DOCUMENTS

| | | | | |
|---|---|---|---|---|
| 10,129,135 | B1 * | 11/2018 | Viljoen | H04L 45/08 |
| 10,491,545 | B2 * | 11/2019 | McDonald | H04L 49/3009 |
| 10,491,718 | B2 * | 11/2019 | Arad | H04L 69/12 |
| 10,862,796 | B1 * | 12/2020 | Dickinson | H04L 45/64 |
| 11,184,282 | B1 * | 11/2021 | Kheradmand | H04L 45/74 |

(Continued)

FOREIGN PATENT DOCUMENTS

| | | | | |
|---|---|---|---|---|
| CZ | 201200264 A3 * | 7/2013 | | H04L 12/40 |
| EP | 3051724 A1 * | 8/2016 | | H04J 14/0204 |

(Continued)

OTHER PUBLICATIONS

High-Performance and Dynamically Updatable Packet Classification Engine on FPGA Yun R. Qu; Viktor K. Prasanna IEEE Transactions on Parallel and Distributed Systems Year: 2016 | vol. 27, Issue: 1 | Journal Article | Publisher: IEEE (Year: 2016).*

(Continued)

*Primary Examiner* — Melvin H Pollack
(74) *Attorney, Agent, or Firm* — HARNESS, DICKEY & PIERCE, P.L.C.

(57) ABSTRACT

A device includes a transceiver and processing circuitry. The transceiver is configured to receive an input packet having an input header and forward an output packet having an output header. The processing circuitry is configured to parse the input header, determine recommendations for forwarding a payload of the input packet using a trained neural network and based on the parsed input header, and process the input packet and generate the output packet with the output header based on the recommendations and available resources.

21 Claims, 5 Drawing Sheets

(56) References Cited

U.S. PATENT DOCUMENTS

| | | | | |
|---|---|---|---|---|
| 11,343,358 B2* | 5/2022 | Peled | | H04L 45/74 |
| 11,425,036 B1* | 8/2022 | Herrera | | H04L 45/24 |
| 11,522,789 B2* | 12/2022 | Huang | | H04L 47/12 |
| 11,533,252 B2* | 12/2022 | Vasseur | | H04L 45/123 |
| 11,632,327 B2* | 4/2023 | Kolar | | H04L 45/126 |
| | | | | 709/238 |
| 11,706,130 B2* | 7/2023 | Kolar | | H04L 45/302 |
| | | | | 709/238 |
| 11,809,727 B1* | 11/2023 | Tuzzolino | | G11C 16/08 |
| 11,818,041 B2* | 11/2023 | Ghosh | | G06F 8/63 |
| 11,824,799 B2* | 11/2023 | Melman | | H04L 69/22 |
| 11,838,151 B1* | 12/2023 | Jones | | H04L 25/0224 |
| 2019/0349287 A1* | 11/2019 | Chandra Sekar Rao | | |
| | | | | H04L 47/125 |
| 2020/0084137 A1* | 3/2020 | Bernardi | | H04L 45/64 |
| 2020/0145345 A1* | 5/2020 | Finkelstein | | H04L 47/58 |
| 2021/0149707 A1* | 5/2021 | Thyagaturu | | G06F 9/544 |
| 2021/0367871 A1* | 11/2021 | Musa | | H04L 69/322 |
| 2021/0409316 A1 | 12/2021 | Seshan et al. | | |
| 2022/0108262 A1* | 4/2022 | Cella | | G06Q 10/063118 |
| 2022/0240157 A1* | 7/2022 | Villasante Marcos | | |
| | | | | H04W 40/12 |
| 2023/0015709 A1* | 1/2023 | Bisht | | H04L 43/0876 |
| 2023/0135397 A1* | 5/2023 | Nikain | | H04L 45/24 |
| | | | | 709/238 |
| 2023/0141844 A1* | 5/2023 | Lingala | | H04L 67/63 |
| | | | | 709/238 |
| 2024/0022510 A1* | 1/2024 | Filsfils | | H04L 43/10 |
| 2024/0172001 A1* | 5/2024 | Farooq | | G06N 3/08 |

FOREIGN PATENT DOCUMENTS

| | | | | |
|---|---|---|---|---|
| EP | 3647936 A1 * | 5/2020 | | G06F 3/167 |
| WO | WO-2023076113 A1 * | 5/2023 | | H04L 45/66 |

OTHER PUBLICATIONS

High-Performance and Dynamically Updatable Packet Classification Engine on FPGA Yun R. Qu; Viktor K. Prasanna IEEE Transactions on Parallel and Distributed Systems Year: 2016 | vol. 27, Issue: 1 | Journal Article | Publisher: IEEE (Year: 2016) (Year: 2016).*

AI Routers & Network Mind: A Hybrid Machine Learning Paradigm for Packet Routing Haipeng Yao; Tianle Mai; Chunxiao Jiang; Linling Kuang; Song Guo IEEE Computational Intelligence Magazine Year: 2019 | vol. 14, Issue: 4 | Magazine Article | Publisher: IEEE (Year: 2019).*

"P4 Open Source Programming Language," viewed on Oct. 20, 2021, https://p4.org/.

"Alveo U25 SmartNIC Accelerator Card," viewed on Oct. 20, 2021 https://www.xilinx.com/products/boards-and-kits/alveo/u25.html.

Ruslan Salakhudtinov and Geoffrey Hinton "Deep Boltzmann Machines," Proceedings of the twelfth International Conference on Artificial Intelligence and Statistics, PMLR 5:448-455, 2009.

"Industry's First ACAP; Adaptive Compute Acceleration," viewed on Oct. 20, 2021, https://www.xilinx.com/products/silicon-devices/acap/versal.html.

Github, "Xilinx/Vitis-AI: Vitis AI is Xilinx's development stack for AI inference on Xilinx hardware platforms, including both edge devices and Alveo cards," viewed on Oct. 20, 2021 https://github.com/Xilinx/Vitis-AI.

"TensorFlow," viewed on Oct. 20, 2021 https://www.tensorflow.org/.

"PyTorch," viewed on Oct. 20, 2021, https://pytorch.org/.

Fischer, Asja & Igel, Christian, "An Introduction to Restricted Boltzmann Machines" Jan. 2012, pp. 14-36, 10.1007/978-3-642-33275-3_2.

Extended European Search Report dated Apr. 21, 2023 for corresponding European Application No. 22210913.4.

T. Swamy et al. 'Taurus: A Data Plane Architecture for Per-Packet ML' *Cornell University Library*, arxiv.org, 2020, pp. 1-16.

* cited by examiner

NETWORK DEVICE INCLUDING TRAINED NEURAL NETWORK

BACKGROUND

A field-programmable gate array (FPGA) is an integrated circuit designed to be configured or re-configured after manufacture. FPGAs contain an array of Configurable Logic Blocks (CLBs), and a hierarchy of reconfigurable interconnects that allow these blocks to be wired together, like many logic gates that can be inter-wired in different configurations. FPGAs may thus be programmed to perform various functions.

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

One or more example embodiments provide a device in a network which may improve routing performance of the network and/or reduce transit time of data packets in the network. The device may use a neural network and/or the Programming Protocol-independent Packet Processors (P4) data-plane programming language and programmable hardware (e.g., field-programmable gate arrays (FPGAs)) or other processing circuitry.

At least one example embodiment provides a device comprising a transceiver and processing circuitry. The transceiver is configured to receive an input packet having an input header, and forward an output packet having an output header. The processing circuitry is configured to: parse the input header; determine recommendations for forwarding a payload of the input packet using a trained neural network and based on the parsed input header; and process the input packet and generate the output packet with the output header based on the recommendations and available resources.

At least one example embodiment provides a device comprising: means for parsing an input header of a received input packet; means for determining recommendations for forwarding an output packet using a trained neural network and based on the parsed input header; means for processing the received input packet to generate the output packet based on the recommendations and available resources, the output packet having an output packet header; and means for forwarding the output packet.

At least one example embodiment provides a method for routing data packets through a network, the method comprising: parsing, at a network device, an input header of a received input packet; determining recommendations for forwarding an output packet using a trained neural network and based on the parsed input header; processing the received input packet to generate the output packet based on the recommendations and available resources, the output packet having an output packet header; and forwarding the output packet.

At least one example embodiment provides a non-transitory computer-readable storage medium storing computer-executable instructions that, when executed processing circuitry at a network device, cause the network device to perform a method for routing data packets through a network, the method comprising: parsing, at the network device, an input header of a received input packet; determining recommendations for forwarding an output packet using a trained neural network and based on the parsed input header; processing the received input packet to generate the output packet based on the recommendations and available resources, the output packet having an output packet header; and forwarding the output packet.

According to at least some example embodiments, the processing circuitry may include programmable hardware, such as a field programmable gate array.

The input header and the output header may be in a P4 format.

The trained neural network may be a Boltzmann Machine.

The transceiver may be configured to send the output packet to a first number of network elements and the Boltzmann Machine includes the first number of visible units.

The Boltzmann Machine may include a second number of hidden units, wherein the second number is greater than the first number.

The recommendations may include a recommendation to send the output packet to a first network element among a plurality of network elements. The processing circuitry may be configured to determine whether the available resources allow for the output packet to be sent to the first network element, and process the input packet and generate the output packet based on the recommendations and whether the available resources allow for the output packet to be sent to the first network element.

The transceiver may include a plurality of ports, each of the plurality of ports may be communicatively connected to a respective network element among the plurality of network elements.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
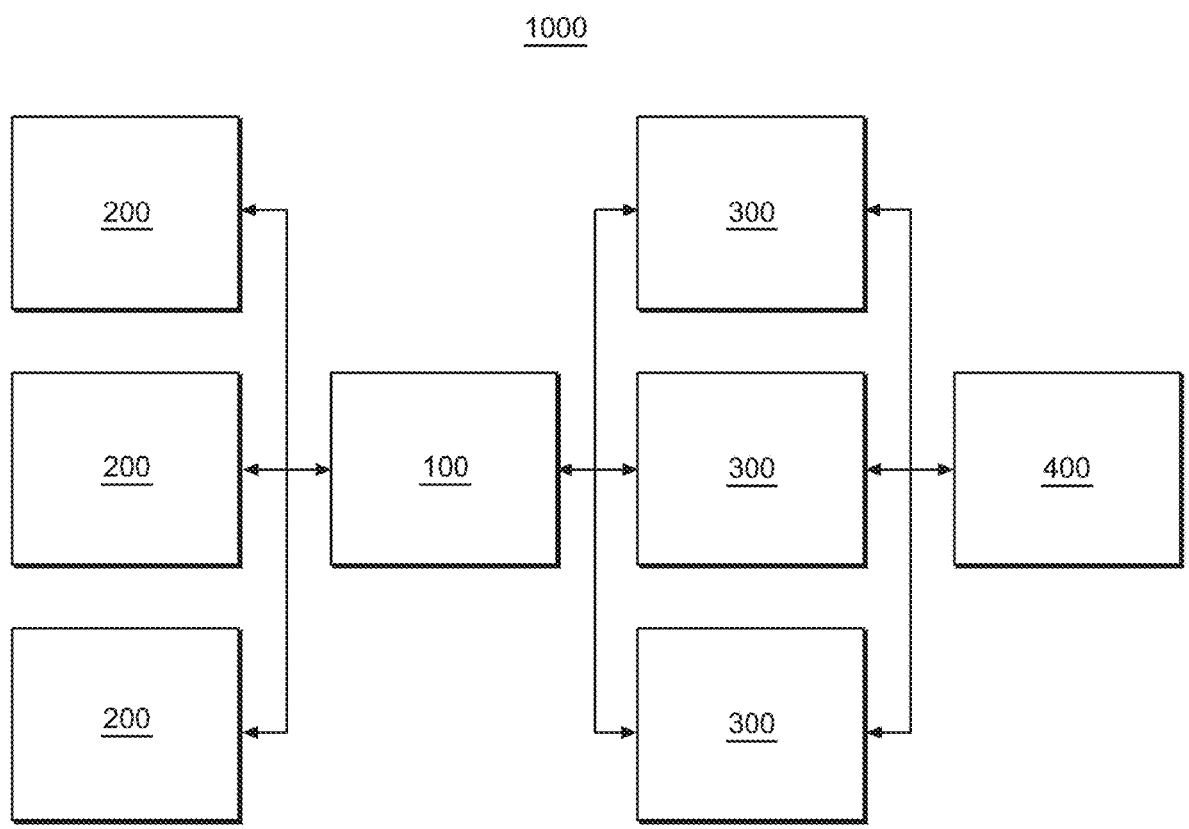
FIG. 1 is a block diagram illustrating a network according to some example embodiments.

It should be noted that these figures are intended to illustrate the general characteristics of methods, structure, and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

In modern cloud-based data centers, servers are often equipped with reconfigurable hardware (e.g., field-programmable gate arrays (FPGAs)), which may be used to accelerate the computation of data-intensive and/or used in time-sensitive applications. The reconfigurable hardware may be interconnected in a free topology (e.g., a connected bidirectional graph of any type). In a case where the reconfigurable hardware includes FPGAs, the interconnected FPGAs may be referred to as a network of FPGAs.

FPGA reconfigurability is referred to as "partial reconfiguration," (PR) which supposes that parts of FPGA hardware may be reconfigured while the FPGA is running (in operation). Partial reconfiguration is performed on allocated portions of a FPGA chip (or FPGA reconfigurable logic), which are known as "partial reconfiguration slots."

A partial reconfiguration slot (PR slot) is a partially reconfigurable zone of a FPGA chip, with size and input/output signals that are defined when developing the FPGA design. The partial reconfiguration zone of the FPGA may be physically reconfigured while the remaining portions of the FPGA are running. Partial reconfiguration allows for multiple tenants in a data center to use/share a single FPGA.

Programming Protocol-independent Packet Processors (P4) is a novel data-plane programming language enabling data-plane programming during the exploitation lifetime of a device. P4 provides a novel paradigm, which differs from the approach used by traditional Application Specific Integrated Circuit (ASIC)-based devices (e.g., switches). Furthermore, P4 is target-independent in that the programming language may be applied to central processing units (CPUs), FPGAs, system-on-chips (SoCs), etc., and is protocol-independent in that the programming language supports all data-plane protocols and may be used to develop new protocols.

In one example, partial reconfiguration slots may be programmed/reprogrammed using P4 to perform network functions or services (e.g., routing, switching, application processing, etc.). Partial reconfiguration slots contain or utilize some FPGA resources allocated in a fixed way (e.g., transceivers (TRXs), Block Random Access Memories (BRAMs), look-up tables (LUTs), flip-flops (FFs), etc.) and a packet forwarding/processing function, which may be programmed by P4 language (referred to as a "P4 block").

P4 applications are composed of P4 modules that use different reconfigurable portions of FPGA's resources.

When implemented on FPGAs, P4 applications allow for reprogramming of only some portions of a FPGA (some or all of the partial reconfiguration slots), without stopping (or interrupting) operation of the device. Alternatively, P4 applications may be part of a FPGA design that does not include partial reconfigurable slots and in which the P4 application(s) does/do not change over time, even though example embodiments may be described with regard to partial reconfiguration in some instances.

FPGAs with P4 modules on their chip or in their partial reconfiguration slots may be interconnected in a web-scale cloud.

Although discussed herein with regard to P4 modules, example embodiments should not be limited to this example.

Devices in networks are often used to route data packets from one device to another. These devices sometimes use FPGAs to perform routing tasks. Often several communication routes and communication methods are available for routing information packets to their desired destinations in the network. Conventionally, static sets of rules may be implemented in these network devices to decide how data packets will be routed.

Static sets of rules for selecting which network device to which to forward the data packet to may, however, be inadequate. One example of a static set of rules is a priority list where all network devices are listed in order of priority and the data packets are sent to a highest priority network device when available network resources (e.g., bandwidth of a connection between the forwarding device and the highest priority network device) allow. If the available network resources do not allow the data packet to be sent to the highest priority network device, then data packets may be sent to the next highest priority network device which available network resources allow.

Example embodiments utilize machine learning based on available information and past results to more dynamically determine or infer a recommended route for a data packet. Example embodiments may reduce routing times (time from the data packet being sent by a source device to a destination device), reduce transmission errors, improve network performance, or the like.

FIG. 1 is a block diagram illustrating a network 1000 according to some example embodiments. The network 1000 may include various network devices (or network elements) including one or more first network devices 100, one or more second network devices 200, one or more third network devices 300, and one or more fourth network devices 400. In the example embodiment shown in FIG. 1, the network 1000 includes one first network device 100, three second network devices 200, three third network devices 300, and one fourth network device 400.

The second network devices 200 may be source devices that generate data packets and send the data packets through the network 1000. The first network device 100 may be a forwarding device, which receives the data packets from the second network devices 200 and forwards each of the data packets to one of the third network devices 300. The third network devices 300 may also be forwarding devices that receive the data packets from the first network device 100 and forward the data packets to the fourth network device 400. The fourth network device 400 may be a destination device that receives the data packets from the third network devices 300.

The illustrated network 1000 is merely an example network showing how network devices can be connected to route packets from source devices to destination devices. Any of the network devices may represent a single electronic device or a group of electronic devices. For example, one of the third network devices 300 may represent a communication path with multiple electronic devices (e.g., switches, routers, etc.) relaying or routing the data packet between the first network device 100 and the fourth network device 400.

The first network device 100 may receive data packets intended for the fourth network device 400 and send the data packets to the fourth network device 400 via one or more of the third network devices 300. As will be discussed in greater detail below, the first network device 100 may determine which of the third network devices 300 to forward the data packets intended for the fourth network device 400.

Examples of source devices (e.g., the second network devices 200) and destination devices (e.g., fourth network devices 400) may be servers and personal electronic devices such as computers, smartphones, tablets, or the like. Examples of forwarding devices, such as the first network device 100 and the third network devices 300 in FIG. 1, may include network bridges, routers, switches, or other network elements.

Figure 2:
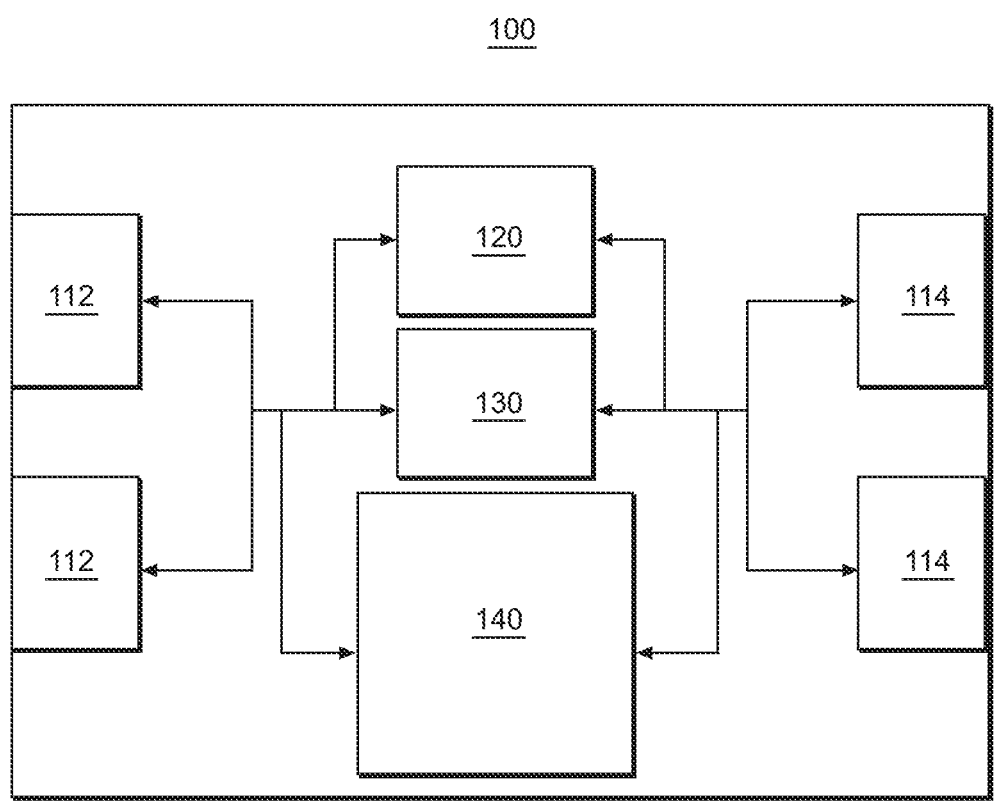
FIG. 2 is a block diagram illustrating a network device according to some example embodiments.

FIG. 2 is a block diagram illustrating a first network device 100 according to some example embodiments. The first network device 100 may include one or more receivers 112, one or more transmitters 114, processor 120, programmable hardware 130, and memory 140. The processor 120 and the programmable hardware 130 may be individually or together characterized as processing hardware or circuitry. The memory 140 may be configured to store information and/or instructions, which the processor 120 may execute and/or use to perform various operations. A receiver 112 and transmitter 114 pair together may be considered a transceiver and may function as one or more ports (input and output ports) for the first network device 100. Each of the ports may be communicatively connected to another respective network device. In the example embodiment shown in FIG. 1, the first network device 100 may communicate with other network devices (e.g., second network devices 200 and third network devices 300). The different ports of the first network device 100 may be configured for communication with the other network devices through different communication methods including wireless local area network, fiber optics, ethernet, Fifth Generation (5G) wireless networks, etc. The first network device 100 may be connected for electronic communication with the other network devices through one or more of the communication methods. The memory 140 may be non-transitory computer readable medium including instructions stored thereon which when executed by a processor, cause the processor to perform the operations disclosed as performed by the first network device 100.

As will be described in greater detail below, the first network device 100 may receive a data packet (input data packet with an input header) via the receiver 112, process the data packet (e.g., via the processing circuitry), generate an output data packet with an output header (e.g., via the processing circuitry), and transmit (e.g., forward or send) the output data packet via the transmitter 114.

The receivers 112 and transmitters 114 may be hardware for communicating with other network devices using the communication methods discussed above. The processor 120 may include one or more processing hardware such as central computing unit, arithmetic logic unit, controllers, etc. The programmable hardware 130 may include FPGAs, ASIC and/or other programmable processing hardware. The memory 140 may include volatile and non-volatile memory. The memory 140, processor 120 and programmable hardware 130 may be included in an accelerator such as an adaptive computer acceleration platform (ACAP), Smart-NIC, or the like, which may be included in, or constitute, a network device discussed herein.

Figure 3:
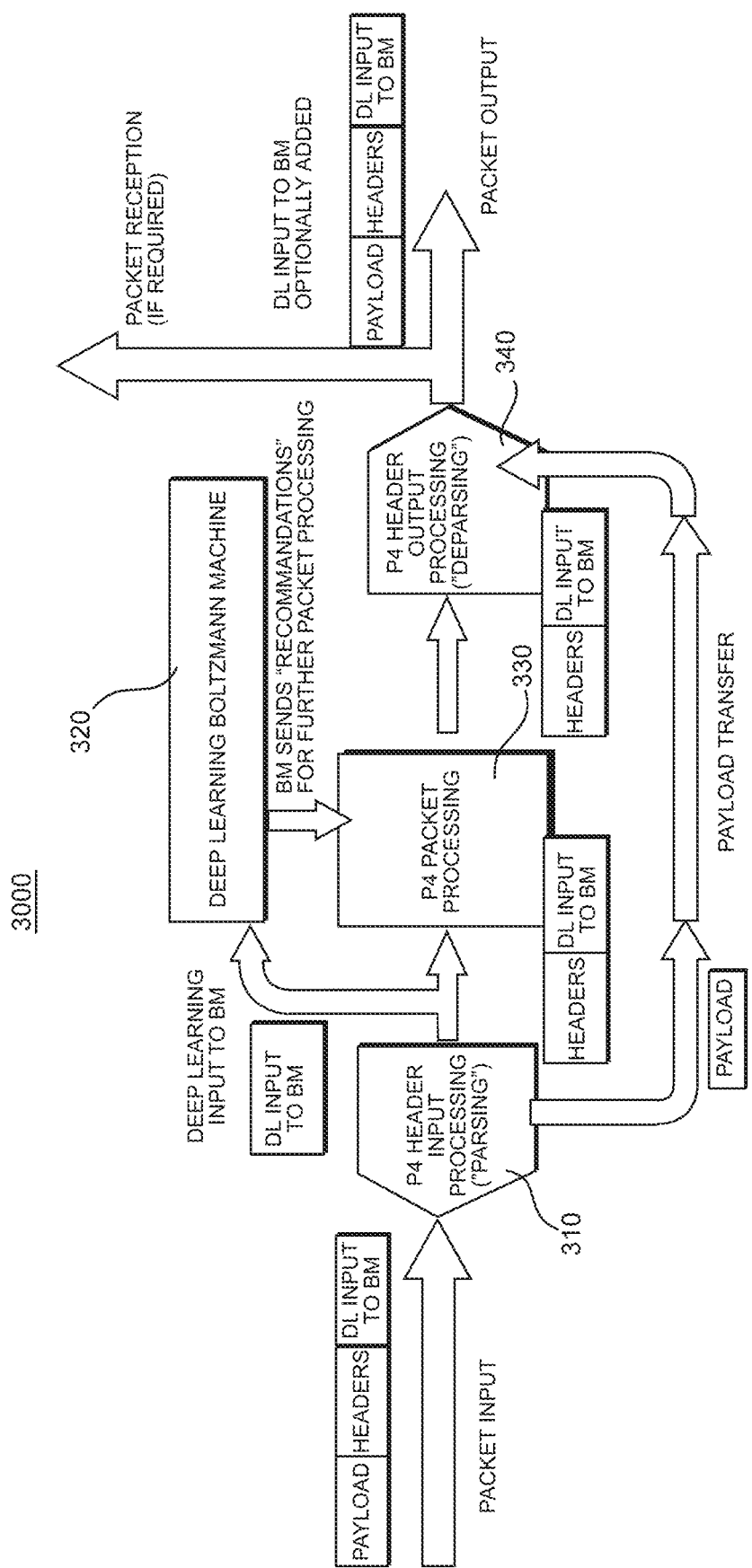
FIG. 3 is a flow diagram illustrating a method according to some example embodiments.

FIG. 3 is a flow diagram illustrating a method for forwarding a data packet according to some example embodiments. The method shown in FIG. 3 will be discussed as being performed by the first network device 100. However, example embodiments should not be limited to this example. Moreover, although the example embodiment shown in FIG. 3 may be discussed with regard to being performed by the network device, it should be understood that various operations may be performed by individual components thereof.

Referring to FIG. 3, at 310, the first network device 100 receives and processes a data packet (input data packet or first data packet). The input data packet may include at least payload, header, and deep learning (DL) input data.

The header may be in the P4 format and may indicate network information, source and destination of the data packet. The P4 format includes any format that is supported by the P4 language (including the headers that are custom, as allowed by P4 language).

The payload may include information intended for the final destination of the input data packet.

The DL input data may include information for input and/or use by a machine learning algorithm. In one example, the DL input data may indicate different network flow paths (e.g., different third network devices 300) and previously known latency over the different network flow paths. For example, a "1" or "0" may be included with an identification of the network flow path and used to indicate whether a latency for the indicated network flow path is below a threshold value and thus indicate if the network flow path is preferred. The network flow paths with an indication of latency below the threshold value (also referred, and indicative of, preference or being preferred) may be indicated by the value of "1". An example threshold value for latency may be about 150 microseconds (μs). At least a portion of the DL input data may be generated by the source device (e.g., second network device 200) and may be added, modified, or generated, by forwarding devices as the first data packet traverses the network 1000. The DL input data may be in the P4 format. Because of the P4 format, the information of the DL input data and the header may be formatted and processed in various forms for various communication methods and protocols (e.g., independent of communication method or protocol).

Still referring to 310 in FIG. 3, the network device 100 may process the header by parsing. Parsing may include reading the header and determining the type of packet, the destination of the data packet, and the priority of the data packet.

The payload of the data packet may be separated from the header without any processing or changes.

At 320, a trained machine learning algorithm receives the DL input data extracted from the input data packet at 310. The trained machine learning algorithm may be a deep learning Boltzmann Machine (BM). Using the P4 format/language, the BM may process information for various communication methods and protocols.

In one example, the DL input data may include the DL input from the input data packet, the destination of the input data packet, and source of the input data packet. Other inputs to the BM may include first network device properties (such as bandwidth for different output ports, processing capabilities, and/or other hardware and software properties), possible flow paths for the data packet, IP addresses of network devices, quality of service (QoS) requirements expressed in latency, jitter, data rate, QoS flow identifier (QFI), and/or other similar information useful for specific communication methods. This information may be stored in the memory 140 of the first network device 100 and may be obtained by the first network device 100 by communications with other network devices and monitoring the functions of the first network device 100.

The BM may be a restricted BM trained with the same classes of data which are input in to the BM to generate the recommendations according to example embodiments. A BM functions by creating visible and/or hidden processing units. In one example, some of the processing units may be visible and some may be hidden. The processing units communicate with each other to determine or infer an output based on the options available. According to example embodiments, the output of the BM may be a recommendation of a forwarding device (e.g., third network device 300) to which to send/forward the data packet.

According to at least one example embodiment, the deep learning BM may include a first number of (e.g., at least one) visible units. The first number may match the number of forwarding network devices with which the first network device 100 can communicate (e.g., directly), or a number of possible routes for the data packet to be forwarded. For example, as shown in FIG. 1, the first network device 100 can communicate directly with three forwarding devices (three third network devices 300), and thus, the first number may be three and the BM may include three visible units.

The BM may also include a second number of hidden units. The second number of hidden units may be greater than the first number of visible units. In some example embodiments, the second number of hidden units may be larger (e.g., five or ten times or more) the first number of visible units. The second number of hidden units may be chosen based on the amount of processing power of the processing hardware and the delay created by the processing. Generally, the BM may generate its output on the order of about 10 is, so the BM may not be the limiting factor in the time before the data packet is forwarded. Generally, a larger number of hidden units may provide a more accurate result but may cause the process to take longer.

Methods according to one or more example embodiments may also be used to determine whether generating a new network slice in a Fifth Generation (5G) network is recommended compared to other methods of forwarding data. The BM may provide the recommendation for the data packet based on the first network device properties and the requirements for the new slice.

According to at least one example embodiment, the BM may be trained using the processing circuitry in the following manner. Load a training data set and a testing data set. Build a restricted Boltzmann Machine with the first number of visible units and the second number of hidden units. Randomly initialize the weights and biases in the restricted Boltzmann Machine model. And applying the K-step contrastive divergence algorithm to train the restricted BM in a desired number of epochs.

Still referring to FIG. 3, at 330, the network device 100 processes the parsed data packet (first data packet) based on one or more of the input headers, the recommendations for further packet processing from the BM, network conditions, or packet priority. The packet processing may be performed according to the P4 language allowing the processing to be done largely independent of the format and protocol of the input header. The recommendations for further packet processing may indicate a recommended route for the first data packet (e.g., a third network device 300 to send the data packet through). The network device 100 may determine if the recommendation may be implemented by checking the current network conditions and determining if the current network conditions allow for the first data packet to be sent over the recommended route. For example, if the first data packet is not a high priority data packet and other higher priority data packets are being sent over the recommended route such that there is no bandwidth for sending the first data packet over the recommended route, then the network device 100 may determine that the data packet should be sent via a forwarding device or route other than the recommended route. As another example, if the recommended route is offline (e.g., is unresponsive), then the network device 100 may send the data packet via a forwarding device or route other than the recommended route. Accordingly, at 330 the network device 100 may determine whether to send the first data packet over the recommended route (e.g., to the recommended third network device 300) or via another route based on one or more of the recommendations for further packet processing from the BM, network conditions, or packet priority.

At 340, the network device 100 may deparse the first data packet to generate the output data packet (e.g., the header of the first data packet may be adjusted according to the P4 packet processing). In one example, the output data packet may be identical or substantially identical to the input data packet. In another example, the output data packet may be different from the input data packet. For example, the DL input may be adjusted or removed from the output data packet. Also, the headers may be changed if the route of the data packet requires an adjustment to the header. For example, the DL input may be removed if the first data packet is to be forwarded to a network device that does not include a BM, and thus, may have no need for the information. As a further example, the format of the header may be changed for the type of network device or location in the network architecture of the forwarding device to which the first data packet is being sent. The data packet may then be sent to the appropriate port (e.g., transmitter 114) for forwarding the first data packet to the intended forwarding device.

In some examples, the payload of the first data packet may have information or commands for the first network device 100. In these cases the data packet may be received, and the payload processed by the network device.

Figure 4:
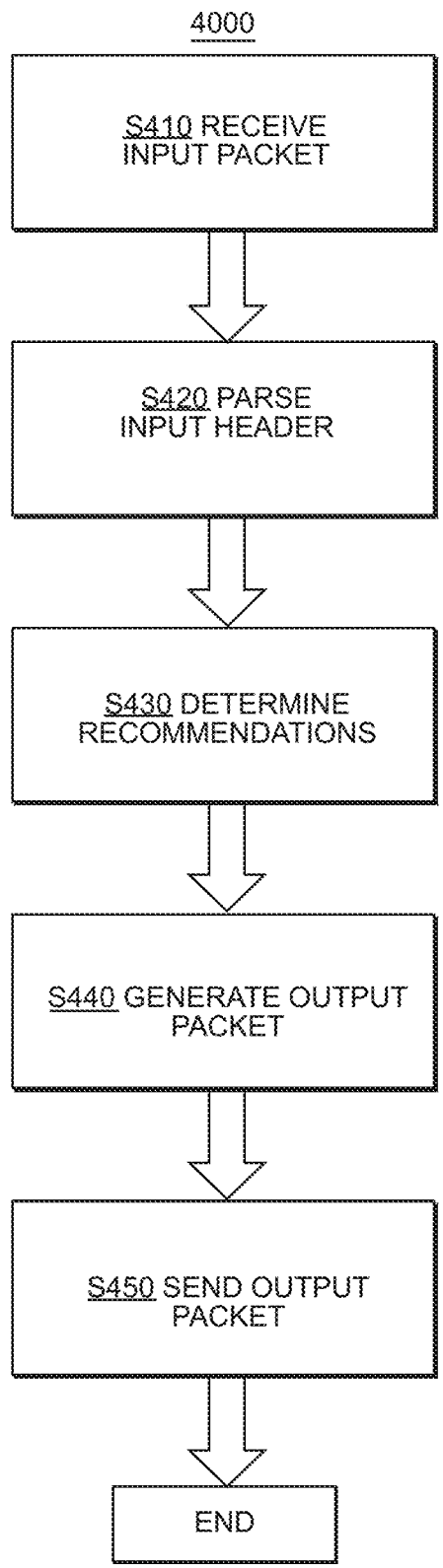
FIG. 4 is a flow chart illustrating a method according to some example embodiments.

FIG. 4 is flow chart illustrating a method for forwarding a data packet according to example embodiments. The method shown in FIG. 4 will be discussed as being performed by the first network device 100. However, example embodiments should not be limited to this example. Moreover, although the example embodiment shown in FIG. 4 may be discussed with regard to being performed by the network device, it should be understood that various operations may be performed by individual components thereof.

Referring to FIG. 4, at S410, the network device 100 (e.g., receiver 112) receives an input data packet. The input data packet may be received from a second network device 200 over the network 1000.

At S420, the network device 100 parses the input data packet header. As discussed similarly above, parsing the input data packet header may include reading the header to determine the type of data packet, the destination of the data packet, and/or the priority of the data packet.

At S430, the network device 100 may use a machine learning algorithm, such as the Boltzmann Machine described above, to determine or generate recommendations for routing the packet. The recommendations may identify a single third network device 300 to which the data packet may be sent. As discussed above, the machine learning algorithm may determine the recommendations based on DL input information from the input data packet including indications of different flow paths and indicators of previously known latency over the different flow paths (e.g., previously known latency of data packet flow through data paths), possible flow paths for the data packet, IP addresses of network devices, quality of service (QoS) requirements expressed in latency, jitter, data rate, QoS flow identifier (QFI), and/or other similar information for specific communication methods.

At S440, the network device 100 generates the output packet including an output packet header based on the recommendations from the machine learning algorithm, a current state of the network 1000 (including the current state of the network devices) and/or other quality of service information/requirements. The generating the output packet may include deparsing the data packet. As discussed similarly above, the deparsing may include generating an output header for the output packet, by copying the input header, modifying the input header or generating a completely new header. The payload from the input data packet may be included in the output data packet without processing or modification. Alternatively, the DL input may be excluded from the output data packet.

At S450 the network device 100 (e.g., transmitter 114) sends (or, alternatively, forwards or transmits) the output data packet via a port configured to communicate with the intended flow path/third network device 300.

Figure 5:
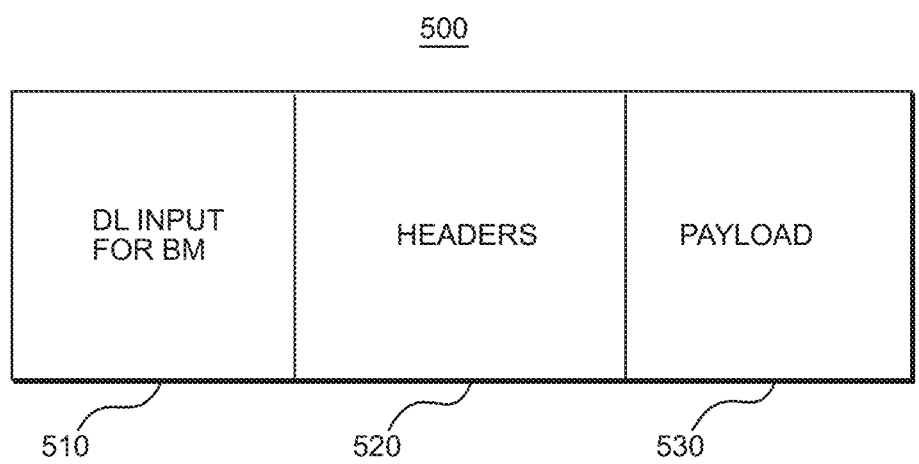
FIG. 5 is a block diagram illustrating a data packet according to some example embodiments.

FIG. 5 is a block diagram illustrating a data packet 500 according to some example embodiments. The data packet 500 may include DL input for the BM 510, headers 520, and a payload 530. As discussed above, the DL input for the BM 510 may include information for input and/or use by a machine learning algorithm including network flow paths and indications of preferences for the network flow paths. The headers 520 may include information for routing the data packet in the network 1000 such as indications of the source and destination of the data packet, and other network routing information. The payload 530 may include information intended for the final destination of the data packet.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures, and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, routers, switches, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), SmartNICs, Adaptive compute acceleration platform (ACAP) or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, routers, switches, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other accelerator, or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A device comprising:
a transceiver configured to
receive an input packet having an input header, and
forward an output packet having an output header; and
processing circuitry configured to,
parse the input header to obtain input data including at least different routing paths and latency over the different routing paths,
determine, using a trained neural network, recommendations for forwarding a payload of the input packet based on the input data, the trained neural network being trained using a neural network algorithm,
determine a routing path for forwarding the payload based on the recommendations and available resources, and
process the input packet and generate the output packet with the output header based on the routing path.

2. The device of claim 1, wherein the processing circuitry includes programmable hardware.

3. The device of claim 2, wherein the programmable hardware is a field programmable gate array.

4. The device of claim 1, wherein the input header and the output header are in a P4 format.

5. The device of claim 1, wherein the trained neural network is a Boltzmann Machine.

6. The device of claim 5, wherein the transceiver is configured to send the output packet to a first number of network elements and the Boltzmann Machine includes a same number of visible units as the first number of network elements.

7. The device of claim 6, wherein the Boltzmann Machine includes a second number of hidden units, wherein the second number is greater than the first number.

8. The device of claim 1, wherein
the recommendations include a recommendation to send the output packet to a first network element among a plurality of network elements, and
the processing circuitry is configured to
determine whether the available resources allow for the output packet to be sent to the first network element, and
process the input packet and generate the output packet based on the recommendations and whether the available resources allow for the output packet to be sent to the first network element.

9. The device of claim 8, wherein the transceiver includes a plurality of ports, each of the plurality of ports is communicatively connected to a respective network element among the plurality of network elements.

10. A method for routing data packets through a network, the method comprising:
  parsing, at a network device, an input header of a received input packet to obtain input data including at least different routing paths and latency over the different routing paths;
  determining, using a trained neural network, recommendations for forwarding an output packet based on the input data, the trained neural network being trained using a neural network algorithm;
  determining a routing path for forwarding the output packet based on the recommendation and available resources;
  processing the received input packet to generate the output packet based on the routing path, the output packet having an output packet header; and
  forwarding the output packet.

11. The method of claim 10, wherein the network device includes programmable hardware.

12. The method of claim 11, wherein the programmable hardware is a field programmable gate array.

13. The method of claim 10, wherein the input header and the output packet header are in a P4 format.

14. The method of claim 10, wherein the trained neural network is a Boltzmann Machine.

15. The method of claim 14, wherein
  the forwarding forwards the output packet to a first number of network elements, and
  the Boltzmann Machine includes a same number of visible units as the first number of network elements.

16. The method of claim 15, wherein
  the Boltzmann Machine includes a second number of hidden units, and
  the second number is greater than the first number.

17. The method of claim 10, wherein
  the recommendations include a recommendation to send the output packet to a first network element among a plurality of network elements, and
  the method includes
    determining whether the available resources allow for the output packet to be sent to the first network element, and wherein
    the processing processes the received input packet and generate the output packet based on the recommendations and whether the available resources allow for the output packet to be sent to the first network element.

18. A non-transitory computer-readable storage medium storing computer-executable instructions that, when executed by processing circuitry at a network device, cause the network device to perform a method for routing data packets through a network, the method comprising:
  parsing, at the network device, an input header of a received input packet to obtain input data including at least different routing paths and latency over the different routing paths;
  determining, using a trained neural network, recommendations for forwarding an output packet based on the input data, the trained neural network being trained using a neural network algorithm;
  determining a routing path for forwarding the output packet based on the recommendation and available resources;
  processing the received input packet to generate the output packet based on the routing path, the output packet having an output packet header; and
  forwarding the output packet.

19. The non-transitory computer-readable storage medium of claim 18, wherein
  the trained neural network is a Boltzmann Machine,
  the Boltzmann Machine includes a first number of visible units,
  the Boltzmann Machine includes a second number of hidden units,
  the second number is greater than the first number, and
  the forwarding forwards the output packet to the first number of network elements.

20. The non-transitory computer-readable storage medium of claim 18, wherein
  the recommendations include a recommendation to send the output packet to a first network element among a plurality of network elements, and
  the method includes
    determining whether the available resources allow for the output packet to be sent to the first network element, and wherein
    the processing processes the received input packet and generate the output packet based on the recommendations and whether the available resources allow for the output packet to be sent to the first network element.

21. A device comprising:
  a transceiver configured to
    receive an input packet having an input header, a payload, and deep learning input data, the deep learning input data including at least different routing paths and latency over the different routing paths, and
    forward an output packet having an output header; and
  processing circuitry configured to,
    parse the input header,
    determine recommendations for forwarding the payload of the input packet using a trained neural network and based on the deep learning input data, and
    process the input packet and generate the output packet with the output header based on the recommendations and available resources.

* * * * *